United States Patent
Taillaert et al.

(10) Patent No.: US 9,810,846 B2
(45) Date of Patent: Nov. 7, 2017

(54) COUPLING METHODS AND SYSTEMS USING A TAPER

(75) Inventors: Dirk Taillaert, Bredene (BE); Diederik Vermeulen, Sint-Pauwels (BE); Jonathan Schrauwen, Gentbrugge (BE); Gunther Roelkens, Melle (BE)

(73) Assignee: Huawei Technologies Co., Ltd., Shenzhen (CN)

( * ) Notice: Subject to any disclaimer, the term of this patent is extended or adjusted under 35 U.S.C. 154(b) by 418 days.

(21) Appl. No.: 13/273,669

(22) Filed: Oct. 14, 2011

(65) Prior Publication Data

US 2012/0093456 A1   Apr. 19, 2012

Related U.S. Application Data

(60) Provisional application No. 61/393,152, filed on Oct. 14, 2010.

(30) Foreign Application Priority Data

Oct. 15, 2010  (EP) .................................. 10187757

(51) Int. Cl.
*G02B 6/12* (2006.01)
*G02B 6/30* (2006.01)
*G02B 6/122* (2006.01)

(52) U.S. Cl.
CPC .......... *G02B 6/305* (2013.01); *G02B 6/1228* (2013.01); *G02B 6/12* (2013.01); *G02B 6/122* (2013.01); *G02B 6/30* (2013.01)

(58) Field of Classification Search
CPC ........ G02B 6/12; G02B 6/122; G02B 6/1228; G02B 6/305; G02B 6/30

(Continued)

(56) References Cited

U.S. PATENT DOCUMENTS 5,263,111 A * 11/1993 Nurse et al. .................. 385/130
5,488,678 A *  1/1996 Taneya et al. ................. 385/14

(Continued)

FOREIGN PATENT DOCUMENTS

DE    102007002191    8/2007
KR         899933 B1   5/2009

(Continued)

OTHER PUBLICATIONS

Fang, Na et al., "A Novel Method of Fabricating 3D Spot-Size Converter on (111) SOI", 2008 IEEE International SOI Conference Proceedings, pp. 79-80.

(Continued)

*Primary Examiner* — Eric Wong
*Assistant Examiner* — Mary A El Shammaa
(74) *Attorney, Agent, or Firm* — Leydig, Voit & Mayer, Ltd.

(57) ABSTRACT

Disclosed are optical devices for coupling radiation between an optical waveguide and an external medium. In one embodiment, an optical device is disclosed comprising a semiconductor die comprising an integrated optical waveguide core and an overlying optical waveguide comprising a waveguide taper and a waveguide facet. The overlying optical waveguide at least partially overlies the integrated optical waveguide core, and the waveguide facet is between about 1 µm and 200 µm from an edge of the semiconductor die. In another embodiment, a method is disclosed comprising providing a substrate comprising an integrated semiconductor waveguide and forming on the substrate an overlying waveguide comprising a waveguide taper and a waveguide facet. The overlying waveguide at least partially overlies the integrated semiconductor waveguide. The method further includes cutting the substrate about 1 µm and 200 µm from the waveguide facet.

18 Claims, 7 Drawing Sheets

(58) Field of Classification Search
USPC .......................................................... 385/14
See application file for complete search history.

(56) References Cited

U.S. PATENT DOCUMENTS

| | | | |
|---|---|---|---|
| 6,393,185 B1* | 5/2002 | Deacon ........................... | 385/50 |
| 6,580,850 B1* | 6/2003 | Kazarinov ......... | G02B 6/12004 |
| | | | 385/16 |
| 6,870,987 B2 | 3/2005 | Lee | |
| 6,925,098 B2* | 8/2005 | Deacon ........................... | 372/20 |
| 6,973,226 B2* | 12/2005 | Sato et al. ....................... | 385/14 |
| 7,103,245 B2 | 9/2006 | Lee et al. | |
| 7,120,350 B2 | 10/2006 | Block et al. | |
| 7,616,854 B2* | 11/2009 | Gill et al. ....................... | 385/43 |
| 7,643,710 B1 | 1/2010 | Liu | |
| 7,664,352 B1* | 2/2010 | Okayama ............. | G02B 6/1228 |
| | | | 385/146 |
| 8,548,288 B2* | 10/2013 | Raj et al. ........................ | 385/14 |
| 2003/0081902 A1* | 5/2003 | Blauvelt ............ | G02B 6/12002 |
| | | | 385/50 |
| 2004/0264905 A1* | 12/2004 | Blauvelt .............. | G02B 6/1228 |
| | | | 385/131 |
| 2005/0185893 A1 | 8/2005 | Liu | |
| 2007/0081764 A1 | 4/2007 | Deliwala | |
| 2007/0274654 A1 | 11/2007 | Choudhury et al. | |
| 2009/0154872 A1* | 6/2009 | Sherrer ................ | G02B 6/4248 |
| | | | 385/14 |
| 2001/0086255 | 4/2010 | Ishizaka | |
| 2010/0202734 A1* | 8/2010 | DeCorby .................. | G01J 3/02 |
| | | | 385/43 |
| 2010/0247031 A1* | 9/2010 | Hayakawa ....... | B29D 11/00663 |
| | | | 385/14 |

FOREIGN PATENT DOCUMENTS

| | | |
|---|---|---|
| WO | WO02/075387 | 9/2002 |
| WO | WO03/044580 | 5/2003 |
| WO | WO2005/064371 | 7/2005 |
| WO | WO2008/111447 A1 | 9/2008 |
| WO | WO2009/106139 A1 | 9/2009 |
| WO | WO2009/106140 A1 | 9/2009 |

OTHER PUBLICATIONS

European Search Report, European Patent Application 10187757.9, dated Mar. 28, 2011.

* cited by examiner

COUPLING METHODS AND SYSTEMS USING A TAPER

CROSS-REFERENCE TO RELATED APPLICATION

This application is a non-provisional of U.S. Provisional Patent Application Ser. No. 61/393,152 filed Oct. 14, 2010, the contents of which are hereby incorporated by reference. Further, this application claims priority to European Patent Application Serial No. 10187757.9 filed Oct. 15, 2010, the contents of which are hereby incorporated by reference.

BACKGROUND

Much research has been devoted to coupling radiation between an optical integrated circuit and an optical fiber, in particular the case in which the size of the mode of the radiation in the optical integrated circuit and in the optical fiber differs largely. Typically, such a difference in mode size results in significant problems. For example, in the case of coupling between a typical single-mode optical fiber used in telecommunications application, which typically has a mode size of about 10 micrometers in diameter, and a semiconductor integrated waveguide used in silicon-on-insulator (SOI) chips, which typically has a mode size of about 0.4×0.2 micrometers, bridging this difference requires specific solutions, such as, for example, a mode-size converter.

One example of a mode-size converter is an SOI inverted taper with an overlying waveguide, which may be used for coupling between a special optical fiber and a SOI chip. However, such a mode-size converter does not allow for coupling to a standard fiber with low loss, as there is still a large mismatch between the mode of the overlying waveguide and a standard optical fiber. Rather, a special optical fiber must be used, such as a lensed fiber or a small core fiber having a high numerical aperture, which has a smaller mode size than standard single-mode fibers. These special optical fibers (in particular the latter) may require precise alignment for use.

Another solution for coupling radiation between an optical integrated circuit and an optical fiber is to use a taper based on a waveguide made of the buried oxide underlying the integrated optical waveguide. The latter results in a minimal theoretical loss of at least 3 dB. For generating an underlying waveguide, the silicon substrate must be etched away locally. Other types of mode-size transforming devices for coupling between an integrated waveguide, e.g. an integrated waveguide on an SOI chip, and a standard fiber are three-dimensional silicon tapers, but these require relatively complex manufacturing steps such as, for example, the deposition of thick amorphous silicon and/or grayscale etching.

Another solution for coupling radiation between an optical integrated circuit and an optical fiber is a grating coupler. Grating couplers can achieve relatively low coupling losses but typically are restricted to efficient operation in a limited bandwidth. For some applications, a bandwidth of more than 100 nm is required, which is not feasible using grating couplers.

Another solution for coupling radiation between an optical integrated circuit and an optical fiber is a lens or a lensed fiber, but that is a very expensive solution because of the required alignment tolerances.

Thus, while several mode-size converter solutions exist for SOI waveguides, the fabrication of these solutions is typically very challenging and requires special processing steps.

During fabrication, usually a plurality of optical integrated circuits are processed on the same wafer, resulting in one wafer comprising multiple, e.g. hundreds or thousands, of identical circuits. Such a wafer then is cut into individual dice using a dicing saw, resulting in a rough facet for coupling radiation. Reducing the roughness may be performed using facet polishing, but this is a delicate, tedious, and expensive process.

SUMMARY

Disclosed are methods and devices for coupling radiation between an optical waveguide of an integrated optical circuit and an optical fiber. Also disclosed are methods for manufacturing such optical devices.

This disclosed methods and devices allow for high coupling efficiency in a broadband wavelength range. Further, the disclosed methods and systems are not sensitive to alignment variations. Still further, the disclosed systems have a small footprint, and can be fabricated with a low-cost wafer-scale process using manufacturing techniques that are compatible with those used for integrated optical circuits. Additionally, no optical fact polishing is required.

In one embodiment, an optical device is disclosed comprising a semiconductor die comprising an integrated optical waveguide core and an overlying optical waveguide comprising a waveguide taper and a waveguide facet. The overlying optical waveguide at least partially overlies the integrated optical waveguide core and the waveguide facet is a distance from an edge of the semiconductor die, the distance being between about 1 μm and 200 μm.

In some embodiments, the overlying optical waveguide comprises a polymer optical waveguide.

In some embodiments, the semiconductor die comprises a bottom cladding layer and the integrated optical waveguide is formed on the bottom cladding layer.

In some embodiments, the integrated optical waveguide comprises an optical waveguide core having a core taper. In these embodiments, the core taper may comprise an inverted taper. Further, in these embodiments, the optical device may further comprise a top cladding layer formed over the core taper. Still further, in these embodiments, the core taper may have a double-tip structure. The double-tip structure may comprise a first tip and a second tip that completely underlies the first tip. Yet further, in these embodiments, the integrated optical waveguide further comprises an oxide inverted taper. Further, in these embodiments, the core taper may be configured to expand a mode size of the integrated optical waveguide.

In some embodiments, the waveguide taper is configured to alter a mode size of the overlying optical waveguide.

In some embodiments, the optical device further comprises an external medium coupled to the waveguide facet. In these embodiments, the optical device may further comprise an index-matching material formed at an interface between the external medium and the waveguide facet. The external medium may comprise one of an optical fiber, an optical fiber array, a laser, and a laser array.

In some embodiments, a plane of a surface of the waveguide taper forms an angle with a plane of a surface of the semiconductor die that is between 80° and 90°.

In another aspect, a method is disclosed comprising providing a substrate comprising an integrated semiconductor waveguide and forming on the substrate an overlying waveguide comprising a waveguide taper and a waveguide facet. The overlying waveguide at least partially overlies the integrated semiconductor waveguide. The method further comprises cutting the substrate at a distance from the waveguide facet, wherein the distance is between about 1 µm and 200 µm.

In some embodiments, the method further comprises aligning an optical fiber with the waveguide facet and coupling radiation between the optical fiber and the waveguide facet. In these embodiments, the method may further comprise depositing an index-matching material at an interface between the optical fiber and the waveguide facet.

In yet another aspect, another method is disclosed comprising providing a substrate comprising a number of integrated semiconductor waveguides and forming on each integrated semiconductor waveguide an overlying waveguide comprising a waveguide taper and a waveguide facet. Each overlying waveguide at least partially overlies the integrated semiconductor waveguide. The method further includes cutting the substrate at a distance from each waveguide facet, where the distance is between about 1 µm and 200 µm.

In some embodiments, the method further comprises separating the integrated semiconductor waveguides from one another.

Particular and preferred aspects of the invention are set out in the accompanying independent and dependent claims. Features from the dependent claims may be combined with features of the independent claims and with features of other dependent claims as appropriate and not merely as explicitly set out in the claims. These and other aspects of the invention will be apparent from and elucidated with reference to the embodiment(s) described hereinafter.

Figure 1:
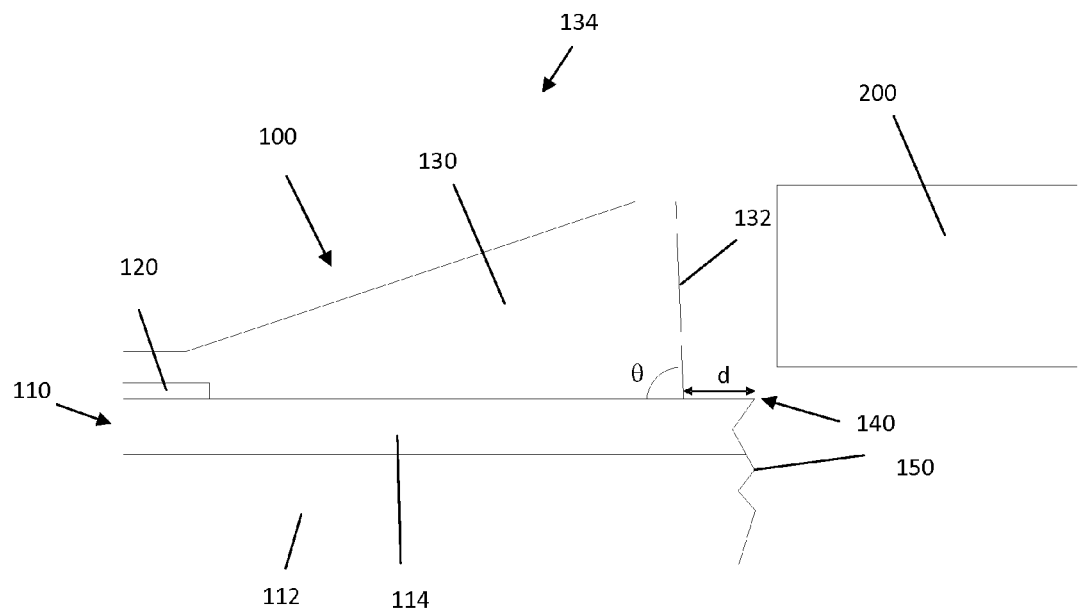
FIG. 1 illustrates an example optical device for coupling radiation between an integrated semiconductor optical waveguide and an external medium, in accordance with an embodiment.

It is to be understood that the drawings are merely schematic and are not meant to be limiting. In the drawings, the size of some of the elements may be exaggerated and not drawn on scale for illustrative purposes. Any reference signs in the claims shall not be construed as limiting the scope. In the different drawings, the same reference signs typically refer to the same or analogous elements.

DETAILED DESCRIPTION

In the following detailed description, numerous specific details are set forth in order to provide a thorough understanding of the disclosure and how it may be practiced in particular embodiments. However, it will be understood that the present disclosure may be practiced without these specific details. In other instances, well-known methods, procedures and techniques have not been described in detail, so as not to obscure the present disclosure. While the present disclosure will be described with respect to particular embodiments and with reference to certain drawings, the disclosure is not limited hereto. The drawings included and described herein are schematic and are not limiting the scope of the disclosure. It is also noted that in the drawings, the size of some elements may be exaggerated and, therefore, not drawn to scale for illustrative purposes.

Furthermore, the terms first, second, third and the like in the description, are used for distinguishing between similar elements and not necessarily for describing a sequence, either temporally, spatially, in ranking or in any other manner. It is to be understood that the terms so used are interchangeable under appropriate circumstances and that the embodiments of the disclosure described herein are capable of operation in other sequences than described or illustrated herein.

Moreover, the terms top, bottom, over, under and the like in the description are used for descriptive purposes and not necessarily for describing relative positions. It is to be understood that the terms so used are interchangeable under appropriate circumstances and that the embodiments of the disclosure described herein are capable of operation in other orientations than described or illustrated herein.

It is to be noticed that the term "comprising" should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components or groups thereof. Thus, the scope of the expression "a device comprising means A and B" should not be limited to devices consisting only of the components A and B.

In embodiments of the following disclosure, an integrated optical waveguide or optical waveguide core may be understood to refer to an optical waveguide or optical waveguide core that is integrated in an integrated optical circuit. An integrated optical circuit, which also may be referred to as photonic integrated circuit (PIC), may refer to a variety of forms and material systems such as, for example, low-index contrast waveguide platforms (e.g., polymer waveguides, glass/silica waveguides, $Al_xGa_{1-x}As$ waveguides, $In_xGa_{1-x}As_yP_{1-y}$ waveguides), high-index contrast waveguides (e.g. Silicon-on-Insulator, semiconductor membranes), and plasmonic waveguides (e.g. metal nano-particle arrays, metal layers), also called Planar Lightwave circuits (PLC).

The integrated optical waveguide or optical waveguide core may, for example, be integrated monolithically. Monolithic integration uses a single processing flow to process diverse components, potentially using different materials. Heterogeneous integration, on the other hand, uses separate process flows to process diverse components, which are then integrated at die or wafer level using, for example, benzocyclobutene (BCB) bonding, wafer bonding, and other bonding schemes, such as three-dimensional integration. Hybrid integration is the integration of components or materials on processed photonic integrated platforms.

While the disclosed methods and devices are described with a focus on a SOI system (also called a silicon photonics system), it to be understood that the disclosed methods and devices could be used in other material systems as well, including, for example, III-V material systems, metallic layers, low-index contrast material systems, or a combination thereof.

SOI is an interesting material system for highly integrated photonic circuits. Using SOI also has some technological advantages. Accordingly, and as a result of the complementary metal-oxide-semiconductor (CMOS) industry, silicon technology has reached a level of maturity that outperforms any other plane chip manufacturing technique by several orders of magnitude in terms of performance, reproducibility and throughput. Nano-photonic integrated circuits can be fabricated with wafer-scale processes, in which a single wafer contains a large number of photonic integrated circuits. Combined with the commercial availability of large wafers at a relative moderate cost, this means that the price per photonic integrated circuit can be very low.

In embodiments of the following disclosure, a taper may be understood to refer to a light-guiding structure that becomes narrower (e.g., that reduces in cross-sectional size and/or that gradually narrows in cross-section) along its length.

FIG. 1 illustrates an example optical device 100 for coupling radiation between an integrated semiconductor optical waveguide and an external medium 200, in accordance with an embodiment. As shown, the optical device 100 includes a semiconductor die 110. The semiconductor die 110 may, for example, be based on SOI technology. Other semiconductor dies are possible as well.

As shown, the semiconductor die 110 comprises an integrated semiconductor optical waveguide with an optical waveguide core 120. The optical waveguide core 120 is configured to propagate radiation. In some embodiments, the integrated semiconductor optical waveguide may be integrated through monolithic integration, heterogeneous integration, or hybrid integration.

The semiconductor die 110 further comprises an overlying optical waveguide 134 comprising a waveguide taper 130. The overlying optical waveguide 134 comprising the waveguide taper 130 at least partially overlies the integrated semiconductor optical waveguide comprising the optical waveguide core 120. The waveguide taper 130 may be shaped for coupling radiation between the optical waveguide core 120 and an external medium 200. The external medium 200 may be, for example, an optical fiber. Other external media are possible as well.

The overlying optical waveguide 134 may comprise several sections. The waveguide taper 130 may include a tapered section that tapers both horizontally and vertically. The tapering may aid in converting mode size between the optical waveguide core 120 and the external medium 200.

As shown, the waveguide taper 130 comprises a waveguide facet 132 configured to receive (and emit) radiation from (and to) the external medium 200. The waveguide facet 132 of the waveguide taper 130 may be spaced from an edge 140 of the semiconductor die 110 by a distance d. The distance d may, for example, be at least 1 µm but less than 200 µm. Other distances are possible as well. The edge 140 may be created by a cut 150 during a wafer-scale manufacturing process. Because the cut 150 is the distance d away from the waveguide facet 132, the waveguide facet 132 is not damaged during cutting. As a result, no polishing is necessary; the waveguide facet 132 can have sufficiently low roughness to enable efficient coupling. Also, the distance d may be sufficiently small to still allow for low coupling loss.

The waveguide facet 132 may have a size adapted for matching the external medium 200. In some embodiments, the waveguide taper 130 may have a 10 micrometer by 10 micrometer cross-section near the waveguide facet 132 and may taper to a 2 micrometer by 2 micrometer cross-section at the end opposite the waveguide facet 132. More generally, the length, width, and height of the waveguide taper 130 can be selected so as to correspond with other features of the optical circuit.

For example, the dimensions of the waveguide taper 130 at the end opposite the waveguide facet 132 may be determined by the coupling to the external medium 200. In embodiments where the external medium 200 comprises an optical fiber, for example, the mode of the optical waveguide core 120 should be matched to the mode of the optical fiber to achieve a high coupling efficiency.

Figure 11:
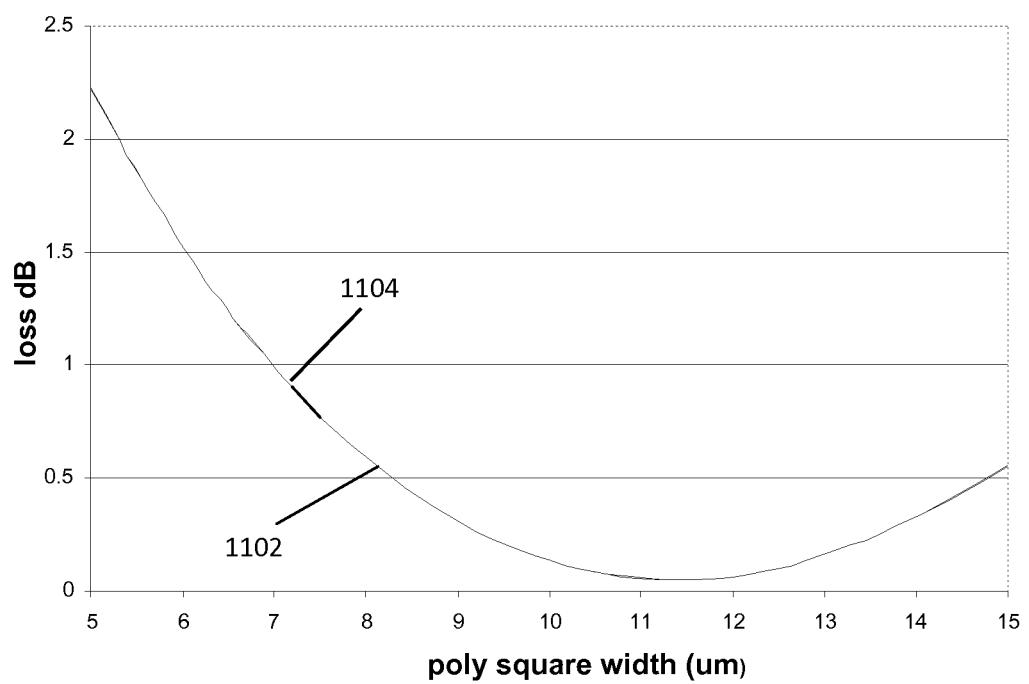
FIG. 11 illustrates coupling loss between an optical fiber and a polymer three-dimensional taper as a function of facet width for square-shaped facets, in accordance with an embodiment.

FIG. 11 illustrates coupling loss between an optical fiber and a polymer three-dimensional taper as a function of facet width for square-shaped facets, in accordance with an embodiment. As shown, the optical fiber is a single mode fiber (9.2 um mode field diameter (MFD) at 1310 nm wavelength), and the taper is included in a square polymer waveguide. Both the transverse magnetic (TM) mode 1102 and the transverse electric (TE) mode 1104 are shown, though the TM mode and the TE mode coincide.

Returning to FIG. 1, in order to couple the external medium 200 to the optical waveguide, the mode size of the external medium 200 should match or approximate the mode size of the optical waveguide. Typically, the mode size of the optical waveguide is smaller than that of the external medium 200. Further, the beam of an optical waveguide is typically elliptical while that of the external medium 200 may be circular. For this reason, the optical waveguide may be designed to be rectangular (e.g., instead of square). In general, the dimensions at the waveguide facet 132 of the optical waveguide may be selected based on the dimensions of the external medium 200. For example, in embodiments where the external medium 200 comprises an optical waveguide formed with SOI technology, the dimensions of the waveguide facet 132 may be about 2 micrometers by 2 micrometers, or 3 micrometers by 3 micrometers. For dimensions smaller than these, the waveguide taper 130 would have to be longer and/or the alignment may suffer. For dimensions larger than these, the coupling would be less efficient (e.g., there would be more coupling loss). The length of the waveguide taper 130 may be determined to achieve a (nearly) adiabatic transition in the waveguide taper 130. In this case, the coupling efficiency between the optical waveguide and the external medium 200 may be substantially lossless.

The taper length can be calculated numerically, and must be selected to balance competing loss, space, and/or fabrication efficiencies. In particular, if the taper length is too short, there will be additional loss. However, if the taper length is too long, the waveguide taper 130 will take up more space on the chip. Further, if there is absorption loss in the optical waveguide, this loss will increase if the taper length is longer. Longer structures may also be more difficult to fabricate.

While the waveguide taper 130 is shown in FIG. 1 to be linear, in some embodiments the waveguide taper 130 may take other shapes. In these embodiments, the waveguide taper 130 may, for example, be shorter. For example, the waveguide taper 130 may be curved. This may enable focusing of the radiation in plane, which may in turn allow for a shorter taper. Other examples are possible as well. The angle of the facet plane of the first taper with respect to an average plane through the semiconductor die may, for example, be between 80° and 90.

The waveguide taper 130 may be made of any suitable material. Example suitable materials include polymers, oxides, and oxinitrides. Other materials are possible as well. In some embodiments, the waveguide taper 130 may be made of a material that can be easily applied on the semiconductor die 110. The waveguide taper 130 may be applied through, for example, embossing, imprinting, and imprinting lithography. The waveguide taper 130 may be applied in other ways as well.

Polymers may be a desirable material for the waveguide taper 130 as they are imprintable, which may allow for the use of low-cost fabrication technology. In some embodiments, the waveguide taper 130 may be manufactured at wafer-scale. In these embodiments, only one additional processing step would be required to provide the waveguide taper 130 and the optical waveguide.

As noted above, the optical waveguide core 120 is integrated in the semiconductor die 110. In some embodiments, the semiconductor die 110 may comprise a substrate 112 and a bottom cladding layer 114. In these embodiments, the optical waveguide core 120 may be positioned on the bottom cladding layer 114.

Figure 2:
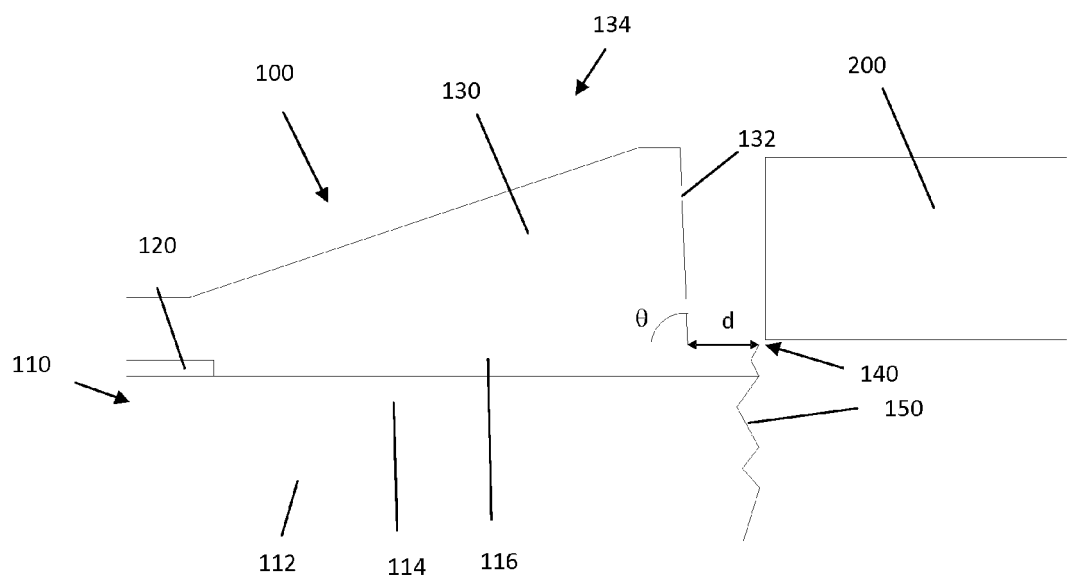
FIG. 2 illustrates another example optical device for coupling radiation between an integrated semiconductor optical waveguide formed on a bottom cladding layer and an external medium, in accordance with an embodiment.

FIG. 2 illustrates another example optical device 100 for coupling radiation between an integrated semiconductor optical waveguide formed on a bottom cladding layer 114 and an external medium 200, in accordance with an embodiment. As shown, the optical device 100 is similar to that described above in connection with FIG. 1, with the exception that a top cladding layer 116 is present. In some embodiments, the top cladding layer 116 may be part of the optical waveguide.

In some embodiments, the external medium 200 may comprise an optical fiber, such as a single-mode optical fiber or an optical fiber array. The optical fiber may be, for example, a standard single-mode optical fiber, such as, for example, a Corning SMF28 fiber, which has around a 10 micrometer diameter and allows for good alignment tolerance. In general, a larger diameter optical fiber may allow for easier alignment. In other embodiments, the external medium 200 may comprise a laser or a laser array.

In order to couple the optical waveguide to the external medium 200, a coupling is made between the waveguide facet 132 and a facet of the external medium 200. To this end, an index-matching material, such as a fluid, gel, or glue, may be used to avoid unwanted reflections at the interface between the facets. The material may have an optimized refractive index, low optical loss, and good strength and reliability.

In some embodiments, the top cladding layer 116 may, for example, comprise the same material as (or a material with a similar index to) the index-matching material.

Figure 3:
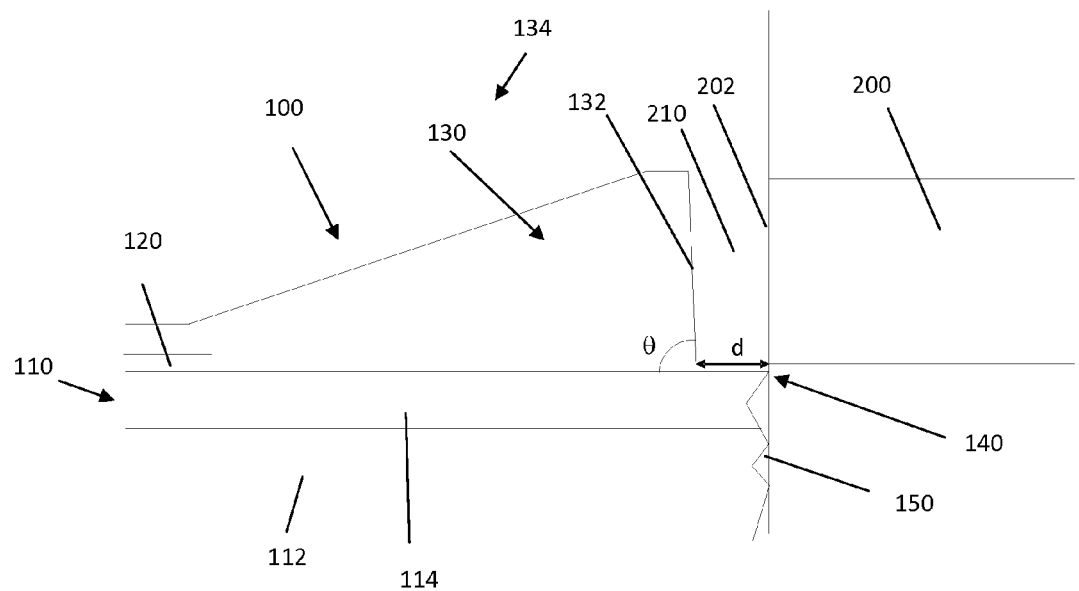
FIG. 3 illustrates yet another example optical device for coupling radiation between an integrated semiconductor optical waveguide and an external medium using an index-matching material, in accordance with an embodiment.

FIG. 3 illustrates yet another example optical device 100 for coupling radiation between an integrated semiconductor optical waveguide and an external medium 200 using an index-matching material 210, in accordance with an embodiment. The optical device 100 shown in FIG. 3 is similar to that shown in FIG. 1 with the exception that an optical fiber facet 202 is shown on the external medium 200, shown in FIG. 3 as an optical fiber.

As shown, the optical fiber facet 202 is aligned and mounted in optical contact with the waveguide facet 132 of the waveguide taper 130, and an index-matching material 210 is provided between the facets 132, 202.

In some embodiments, the optical waveguide core 120 may include a core taper 410. The core taper 410 may be a semiconductor taper, such as an inverted lateral semiconductor taper. An inverted lateral taper is a taper that expands the optical mode size, such that it "forces" the light out of the core taper 410 into the surrounding material. It can be referred to as inverted because the size of the mode increases as the size of the taper structure decreases whereas in a "normal" taper, the size of the mode increases as the size of the taper structure increases.

The mode size of a waveguide typically does not scale linearly with the dimensions of the waveguide core. Rather, the mode size of the waveguide typically depends on the size of the waveguide, the refractive index, and the wavelength. If, for example, a SOI waveguide (having, for example, a silicon core and oxide cladding) is considered with dimensions 0.4 um×0.2 um and a 1550 nm wavelength, then the mode size of the fundamental waveguide mode is increased if the size of the waveguide is increased. If, on the other hand, the size of the waveguide is decreased, the mode size of the waveguide mode will also decrease. At a certain point, however, if the size of the waveguide is further decreased, the mode size will actually increase. This is the case because the waveguide core becomes too small to confine most of the light in the core and thus the mode is expanded. This principle may be applied to the core taper 410. In particular, the core taper 410 may be made such that the cross-section is reduced from within the submicron range to the sub 100 nm range in width.

In some embodiments, the core taper 410 may be formed in the same etch step(s) as other components of the optical device, so that no additional steps or no additional processing steps requiring a different technology are needed.

Figure 4:
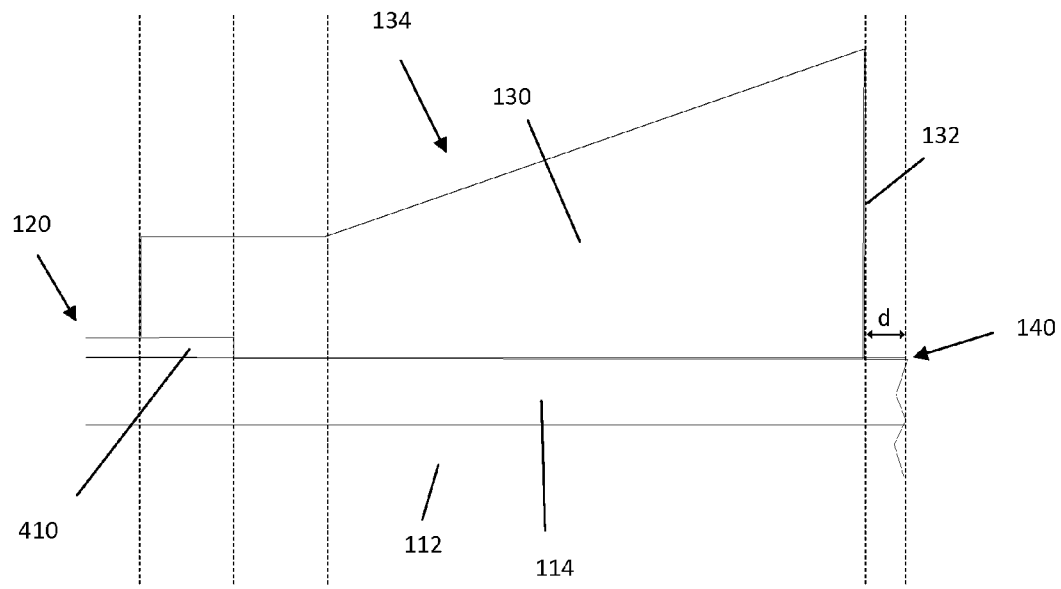
FIG. 4 illustrates a side view of an example optical device for coupling radiation between an integrated semiconductor optical waveguide comprising a core taper and an external medium, in accordance with an embodiment.

FIG. 4 illustrates a side view of an example optical device for coupling radiation between an integrated semiconductor optical waveguide comprising a core taper 410 and an external medium 200, in accordance with an embodiment. As shown in FIG. 4, the core taper 410 converts the cross-sectional dimensions of the optical waveguide from, for example, about 0.4 μm×0.2 μm to about 200 nm×100 nm or less. Other dimensions are possible as well.

In some embodiments, the core taper 410 may comprise a double-tip structure. The double-tip structure may be such that a first tip is overlying a second tip. Other tip structures (e.g., single-tip, triple-tip, etc.) are possible as well. The double-tip structure may be obtained using, for example, a double etching process, in which a shallow etch is performed to form the first tip structure and a further etch is performed to form the second tip structure.

Figure 6:
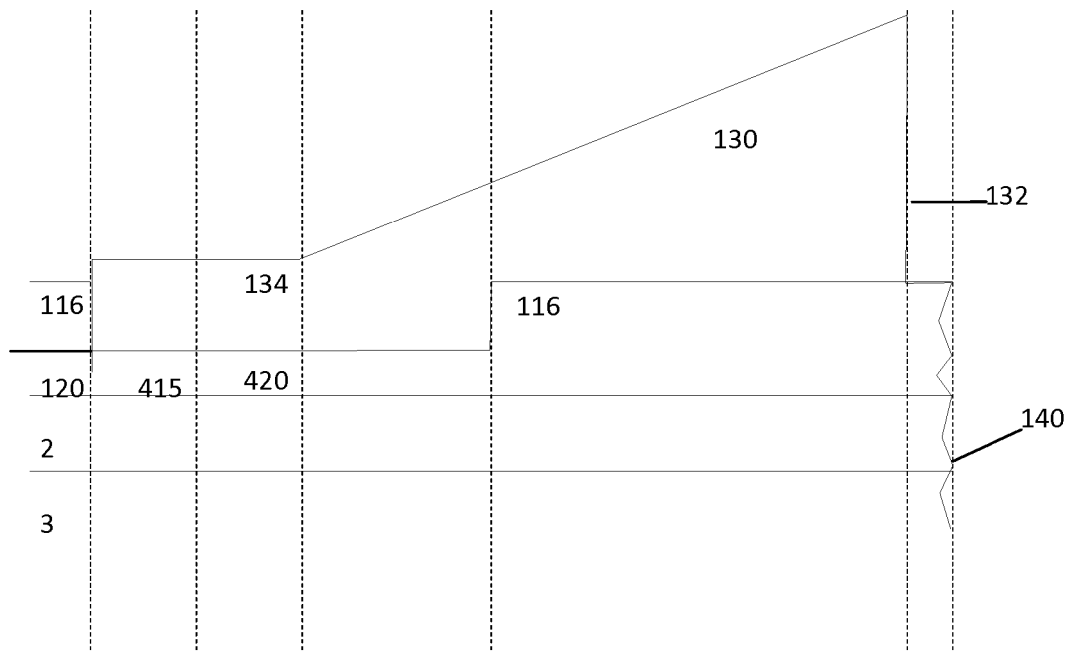
FIG. 6 illustrates a side view of an example optical device for coupling radiation between an integrated semiconductor optical waveguide comprising a core taper with a double-tip structure and an external medium, in accordance with an embodiment.

FIG. 6 illustrates a side view of an example optical device for coupling radiation between an integrated semiconductor optical waveguide comprising a core taper with a double-tip structure and an external medium 200, in accordance with an embodiment. As shown, the core taper comprises a first tip 415 and a second tip 420. The optical device further comprises a top cladding layer 116, as described above.

Figure 7:
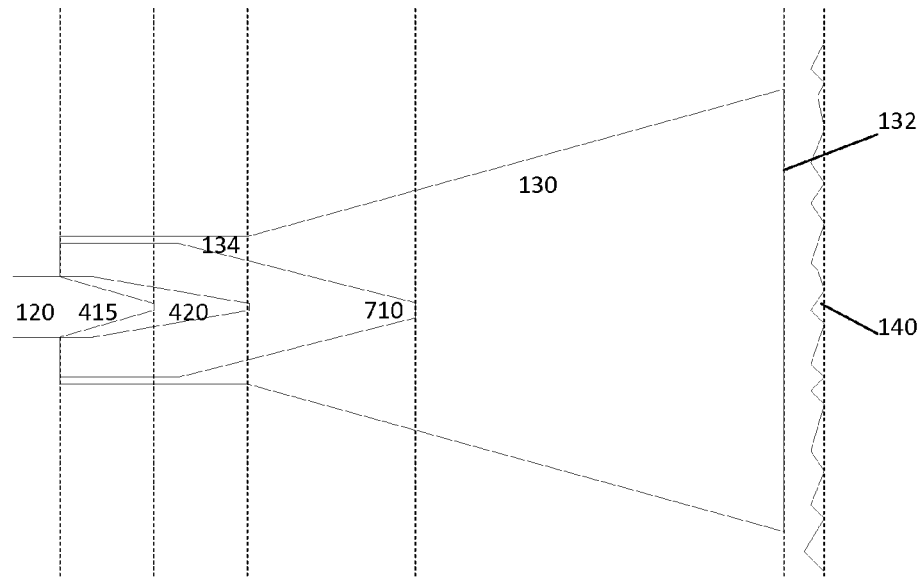
FIG. 7 illustrates top view of the example optical device shown in FIG. 6, in accordance with an embodiment.

FIG. 7 illustrates top view of the example optical device shown in FIG. 6, in accordance with an embodiment. As shown, the optical device further includes an oxide inverted taper 710.

The double-tip structure may, in some embodiments, reduce coupling loss. For a comparable coupling loss, a single-tip structure may have to have a width below 100 nm, which may require more costly manufacturing.

Figure 8:
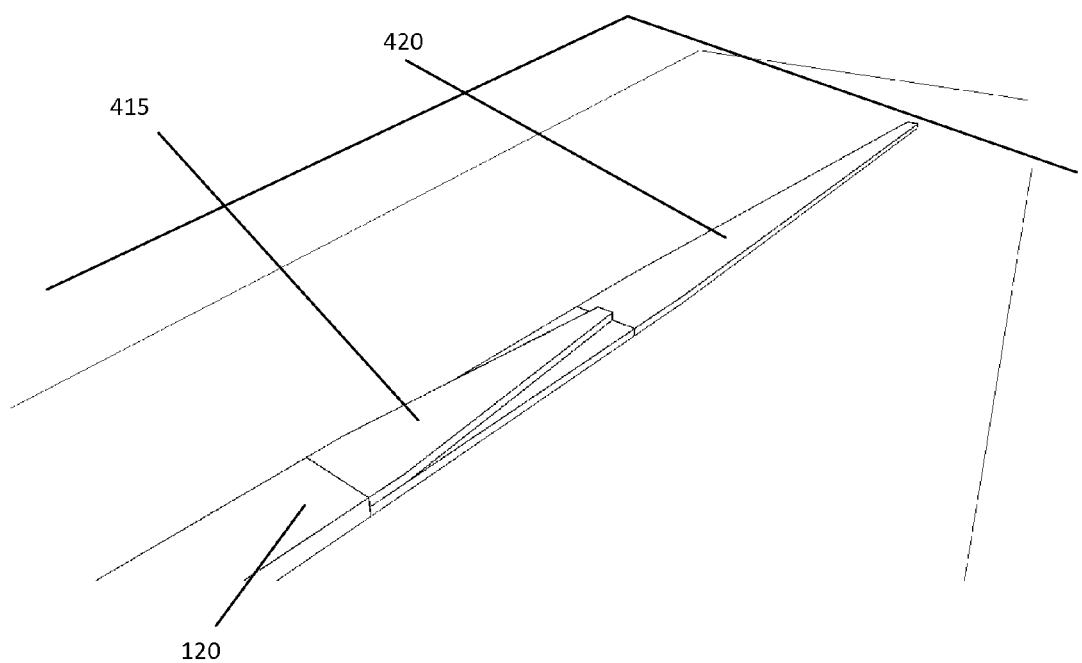
FIG. 8 illustrates an elevated top view of the example optical device shown in FIG. 6, in accordance with an embodiment.

FIG. 8 illustrates an elevated top view of the example optical device shown in FIG. 6, in accordance with an embodiment. In the embodiment shown in FIG. 8, the first tip 415 may have a thickness on the order of, for example, 220 nm, while the second tip 420 may have a thickness on the order of, for example, 150 nm.

In some embodiments, any of the above-disclosed optical devices may further include one or more additional components, such as, for example, optical couplers, additional waveguides, additional tapers, a tuneable filter, a phase-shifter, a grating, a modulator, a multiplexer, a demultiplexer, or any combination thereof. Such additional optical components may be active or passive.

A number of example optical devices are described in connection with FIGS. 4 and 5. It is to be understood that the positions, dimensions, shapes, materials, and fabrication processes described in connection with the example optical devices are merely illustrative and are not meant to be limiting. That is, other positions, dimensions, shapes, materials, and fabrication processes are possible as well.

Figure 5:
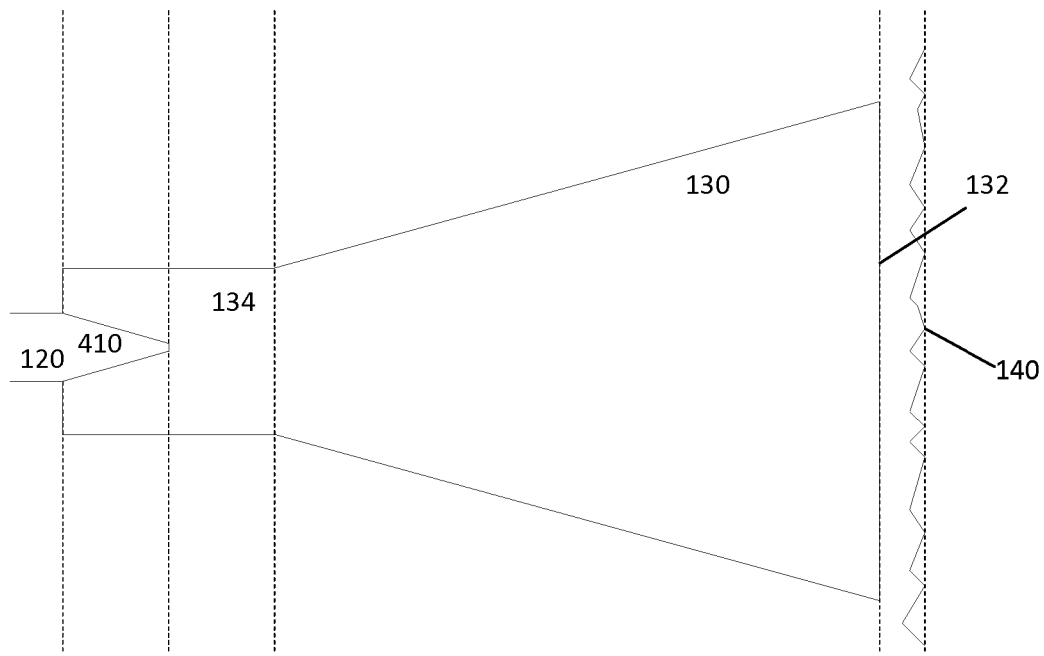
FIG. 5 illustrates a top view of the example optical device shown in FIG. 4, in accordance with an embodiment.

FIGS. 4 and 5 illustrate a side view and a top view, respectively, of an example optical device for coupling radiation between an integrated semiconductor optical waveguide comprising a core taper 410 and an external medium 200, in accordance with an embodiment. As shown in FIG. 4, the optical waveguide core 120 may comprise silicon. Further, the core taper 410 may comprise an inverted silicon taper that tapers from a width of 400 nm at the waveguide side (e.g., the left) to a tip width of 60 nm. The length of the core taper 410 may be, for example, about 150 µm. The bottom cladding layer 114 may comprise a buried oxide, and the substrate 112 may comprise a silicon substrate. The overlying optical waveguide 134 may comprise a polymer waveguide, and the waveguide taper 130 may comprise a polymer three-dimensional taper comprising a waveguide facet 132. The overlying optical waveguide 134 and/or the waveguide taper 130 may be made of a material having a refractive index of about 1.55, or another refractive index that is larger than a refractive index of the bottom cladding layer 114. The waveguide taper 130 may taper from a cross-section of 2 µm×2 µm at the waveguide side (e.g., the left) to a cross section of 11 µm×11 µm. The taper length may be, for example, about 400 µm. Between the optical fiber (not shown) and the waveguide taper 130, an index-matching material (e.g., a glue) may be used having a refractive index of, for example, 1.5, or another refractive index that is smaller than the refractive index of the waveguide taper 130.

FIGS. 6-8 illustrate a side view, a top view, and an elevated top view, respectively, of an example optical device for coupling radiation between an integrated semiconductor optical waveguide core comprising a tapered portion with a double-tip structure and an external source, in accordance with an embodiment. As shown, the core taper comprises a double-tip structure comprising a first tip 415 and a second tip 420. The first tip 415 may provide a transition from 220 nm silicon thickness to 150 nm silicon thickness. The second tip 420 may provide a transition from 150 nm silicon thickness to the polymer structure. That is, the second tip 420 may serve to change the mode size from that of the silicon to that of the surrounding polymer or oxide. As shown in FIG. 7, an additional oxide inverted taper 710 also is provided. In the embodiment shown, an index-matching material (such as that described above) is also provided as a top cladding layer 116.

Figure 9:
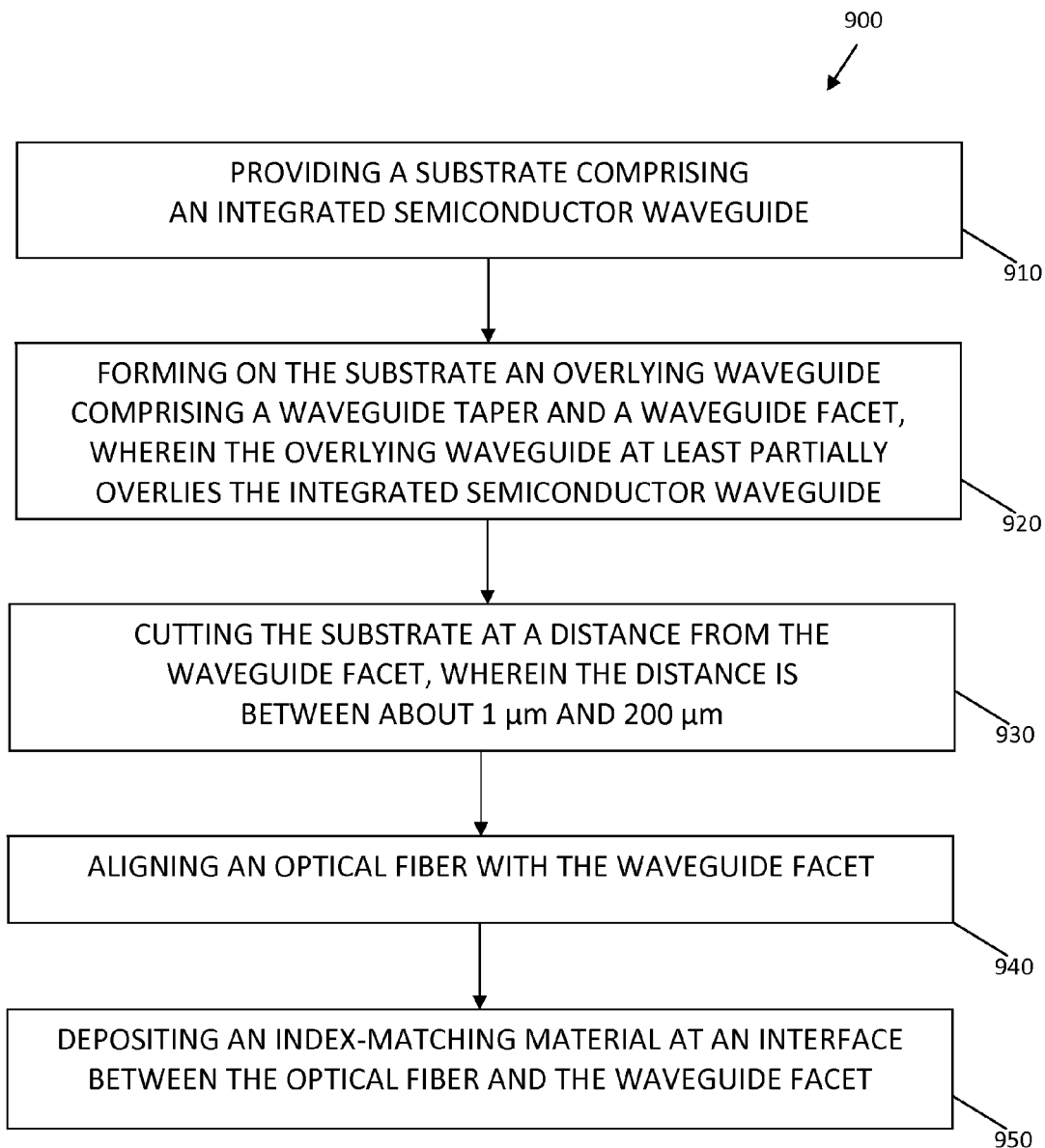
FIG. 9 is a flow chart illustrating an example method of manufacturing an optical device, in accordance with an embodiment.

A method for manufacturing the optical devices described above is also disclosed. FIG. 9 is a flow chart illustrating an example method of manufacturing an optical device, in accordance with an embodiment.

As shown, the method 900 begins at block 910 with providing a substrate comprising an integrated semiconductor waveguide. In some embodiments, the substrate may comprise an SOI wafer. Further, in some embodiments, the integrated semiconductor waveguide may be formed using deep ultraviolet lithography and etching steps. The integrated semiconductor waveguide may integrated monolithically, heterogeneously, or in a hybrid integration, as described above. In some embodiments, the substrate may further comprise a bottom cladding layer, such as a buried oxide layer. Further, in some embodiments, the integrated semiconductor waveguide may comprise a waveguide core, and the waveguide core may comprise a core taper. The core taper may similarly be formed using deep ultraviolet lithography and etching steps.

In some embodiments, the integrated semiconductor optical waveguide may comprise a double-tip structure, as described above. To this end, a first tip (e.g., a silicon inverted tip) may be formed using deep ultraviolet lithography and etching. Then, a second tip may be formed. An oxide may be deposited and a chemical mechanical polish may be performed. Further, a silicon-carbide etch stop layer may be deposited, and lithography and etching may be performed. Another oxide may then be deposited and another chemical mechanical polish may be performed. Finally, a top oxide taper may be formed using lithography and etching. Then, the silicon-carbide etch stop layer may be removed. The resulting structure may, for example, be similar to that shown in FIG. 6, which comprises a first tip 415, a second tip 420, and an oxide inverted taper 710.

The method 900 continues at block 920 with forming on the substrate an overlying waveguide comprising a waveguide taper comprising a waveguide facet, wherein the overlying waveguide at least partially overlies the integrated semiconductor waveguide. The overlying waveguide may, for example, comprise a polymer and, in some cases, may be formed by imprinting. To this end, an imprint resist may be applied (e.g., with a dispenser) and the polymer may be imprinted using a mold or stamp. The polymer may then be cured with, for example, ultraviolet light, and the mold or stamp may be removed. In some embodiments, an anti-adhesion layer may be applied to the mold prior to the imprinting. Alternately, the polymer layer may be formed by etching.

The method 900 continues at block 930 with cutting the substrate at a distance from the waveguide facet, wherein the distance is between about 1 micrometer and 200 micrometers. In some embodiments, a number of integrated semiconductor waveguides and overlying waveguides may be formed on the same substrate, and may be separated by the cutting. The cutting may be performed using conventional cutting tools, such as, for example, a diamond saw with a liquid-cooled blade. The substrate may be mounted for the cutting. In some embodiments, the substrate may be cleaned following the cutting.

The method 900 continues at block 940 with aligning an optical fiber with the waveguide facet. In some embodiments, the optical fiber may comprise a fiber fact, and the aligning may comprise aligning the fiber facet with the waveguide facet.

The method 900 continues at block 950 with depositing an index-matching material at an interface between the optical fiber and the waveguide facet. In some embodiments, the index-matching material may comprise a glue. In other embodiments, the optical fiber and the overlying waveguide may be connected in other manners, such as through a mechanical connection.

In some embodiments, the method 900 may further include forming a top cladding layer over the overlying waveguide. The top cladding layer may, for example, comprise the index-matching material.

Figure 10:
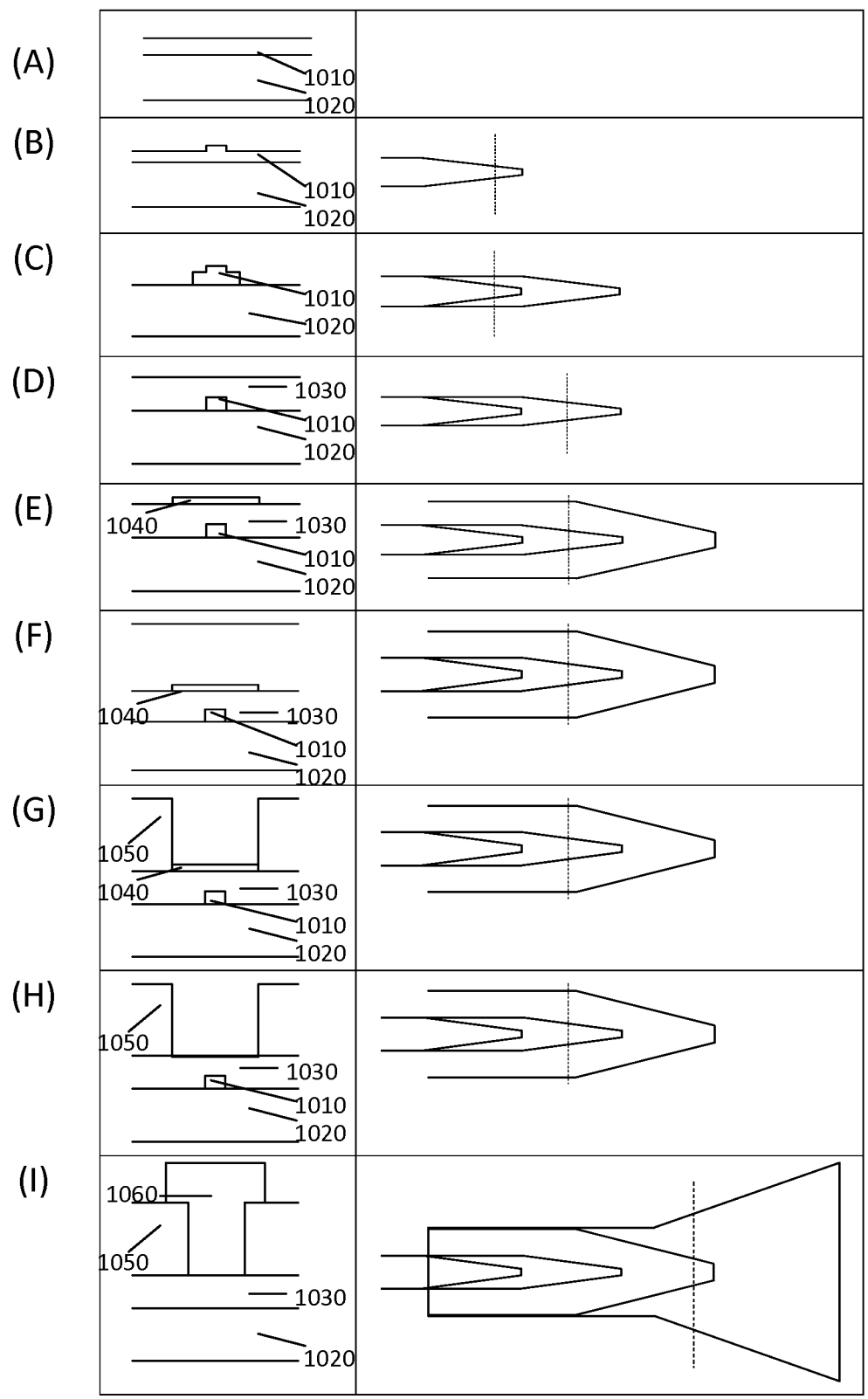
FIG. 10 illustrates a number of intermediate states of the optical device during manufacturing, in accordance with an embodiment.

FIG. 10 illustrates a number of intermediate states of the optical device during manufacturing, in accordance with an embodiment. For each of the manufacturing steps shown, each time a cross-sectional view and top view is shown.

Drawing (A) illustrates the initial substrate, which may, for example, be an SOI substrate. As shown, the substrate comprises a silicon layer 1010 on insulator 1020 substrate.

Drawing (B) illustrates the substrate after a first shallow etch of the silicon layer 1010, whereby a tapered shape is formed in the upper side of the silicon layer 1010.

Drawing (C) illustrates the substrate after a deeper etch in the silicon layer 1010. In the present example this etch results in the silicon layer being completely removed at some positions. In an additional step, a top oxide 1030 is deposited and chemical/mechanical polishing is performed. The structure after these steps is shown in drawing (D).

Drawing (E) illustrates the structure after an etch stop layer 1040 (e.g., silicon-carbide) is deposited and an etch is performed. Thereafter, a second top oxide 1050 is deposited and chemical/mechanical polishing is performed, resulting in the structure shown in drawing (F).

Drawing (G) illustrates the structure after an oxide etch. Drawing (H) illustrates the structure after removal of the etch stop layer.

Drawing (I) illustrates the structure after a polymer 1060 is deposited and imprinted.

The optical device obtained may allow for coupling an optical waveguide to an optical fiber with low coupling loss (e.g., low (e.g., <3 dB) insertion loss over a large wavelength range and/or low polarization dependent loss).

While the invention has been illustrated and described in detail in the drawings and foregoing description, such illustration and description are to be considered illustrative or exemplary and not restrictive. The invention is not limited to the disclosed embodiments. For example, whereas embodiments of the optical device and of a manufacturing device were described, the present invention also relates to a method for handling radiation, the method comprising either coupling radiation from an external medium through an index matching material to a first facet of a polymer taper, the radiation further being tapered to an integrated semiconductor optical waveguide integrated on an integrated optical circuit or comprising guiding radiation from an integrated semiconductor optical waveguide integrated on an integrated optical circuit to an overlying waveguide with taper and further through a facet of the taper towards an external medium, whereby the facet of the taper in both cases is at a distance between 1 µm and 200 µm of an edge of the integrated optical circuit. Further features and advantages of this method may express a functionality of the components as described in the first aspect.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The foregoing description details certain embodiments of the invention. It will be appreciated, however, that no matter how detailed the foregoing appears in text, the invention may be practiced in many ways, and is therefore not limited to the embodiments disclosed. It should be noted that the use of particular terminology when describing certain features or aspects of the invention should not be taken to imply that the terminology is being re-defined herein to be restricted to include any specific characteristics of the features or aspects of the invention with which that terminology is associated.

What is claimed is:

1. An optical device comprising:
   a semiconductor die comprising an integrated optical waveguide; and
   an overlying optical waveguide comprising a waveguide taper, wherein:
   the overlying optical waveguide at least partially overlies an integrated optical waveguide core; and
   the waveguide taper of the overlying optical waveguide comprises a waveguide facet, the waveguide facet being at a distance from an edge of the semiconductor die, the distance being between about 1 µm and 200 µm,
   wherein the integrated optical waveguide comprises an optical waveguide core having a core taper, wherein the core taper has a double-tip structure and the overlying optical waveguide is shaped to couple radiation between the optical waveguide core and an external medium.

2. The optical device of claim 1, wherein the overlying optical waveguide comprises a polymer optical waveguide.

3. The optical device of claim 1, wherein the semiconductor die comprises a bottom cladding layer and the integrated optical waveguide is formed on the bottom cladding layer.

4. The optical device of claim 1, wherein the core taper comprises an inverted taper.

5. The optical device of claim 1, further comprising a top cladding layer formed over the core taper.

6. The optical device of claim 1, wherein the double-tip structure comprises a first tip and a second tip that completely underlies the first tip.

7. The optical device of claim 1, wherein the integrated optical waveguide further comprises an oxide inverted taper.

8. The optical device of claim 1, wherein the core taper is configured to expand a mode size of the integrated optical waveguide.

9. The optical device of claim 1, wherein the waveguide taper is configured to alter a mode size of the overlying optical waveguide.

10. The optical device of claim 1, further comprising an external medium coupled to the waveguide facet.

11. The optical device of claim 10, further comprising an index-matching material formed at an interface between the external medium and the waveguide facet.

12. The optical device of claim 10, wherein the external medium comprises one of an optical fiber, an optical fiber array, a laser, and a laser array.

13. The optical device of claim 1, wherein a plane of a surface of the waveguide taper forms an angle with a plane of a surface of the semiconductor die that is between 80° and 90°.

14. A method comprising:
providing a substrate comprising an integrated semiconductor waveguide;
forming on the substrate an overlying waveguide comprising a waveguide taper and a waveguide facet, wherein the overlying waveguide at least partially overlies the integrated semiconductor waveguide;
cutting the substrate at a distance from the waveguide facet, wherein the distance is between about 1 μm and 200 μm,
wherein the integrated optical waveguide comprises an optical waveguide core having a core taper, wherein the core taper has a double-tip structure and the overlying optical waveguide is shaped to couple radiation between the optical waveguide core and an external medium.

15. The method of claim 14, further comprising:
aligning an optical fiber with the waveguide facet; and
coupling radiation between the optical fiber and the waveguide facet.

16. The method of claim 15, further comprising depositing an index-matching material at an interface between the optical fiber and the waveguide facet.

17. A method comprising:
providing a substrate comprising a number of integrated semiconductor waveguides;
forming on each integrated semiconductor waveguide an overlying waveguide comprising a waveguide taper and a waveguide facet, wherein the overlying waveguide at least partially overlies the integrated semiconductor waveguide;
cutting the substrate at a distance from each waveguide facet, wherein the distance is between about 1 μm and 200 μm
wherein the integrated optical waveguide comprises an optical waveguide core having a core taper, wherein the core taper has a double-tip structure and the overlying optical waveguide is shaped to couple radiation between the optical waveguide core and an external medium.

18. The method of claim 17, further comprising separating the integrated semiconductor waveguides from one another.

* * * * *